July 5, 1960 L. E. NEAGLE, JR 2,944,104

TELETYPEWRITER REMOTE CUTOFF SYSTEM

Filed July 29, 1957

INVENTOR
LEO E. NEAGLE JR.
BY George Sipkin
Leo I. Hantzberger
ATTORNEYS

United States Patent Office 2,944,104

Patented July 5, 1960

2,944,104

TELETYPEWRITER REMOTE CUTOFF SYSTEM

Leo E. Neagle, Jr., 49 Oak St., Cohasset, Mass.

Filed July 29, 1957, Ser. No. 674,986

6 Claims. (Cl. 178—4.1)

Figure 1:
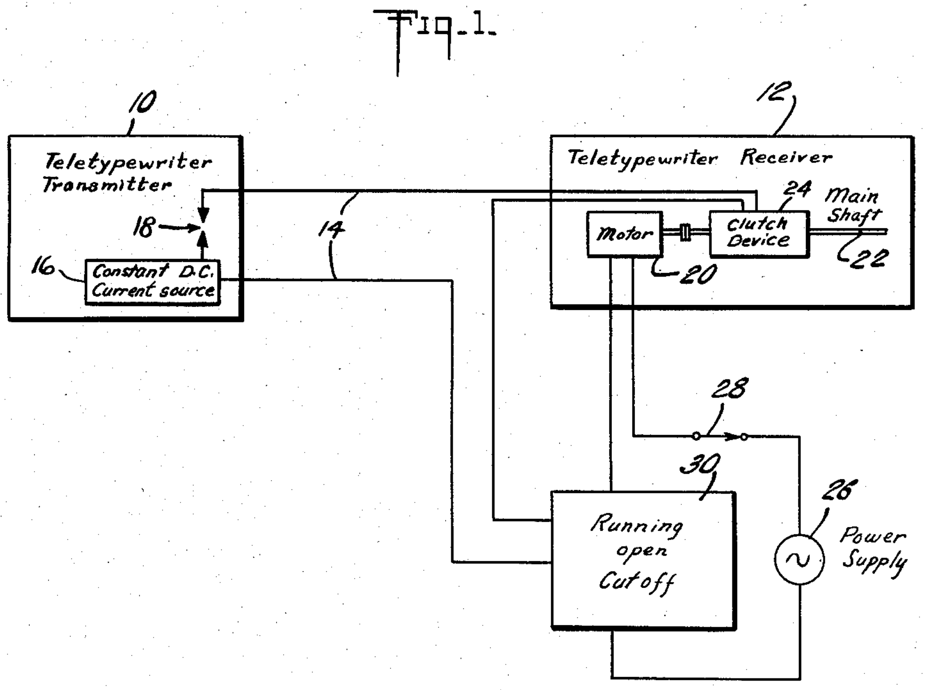

(Granted under Title 35, U.S. Code (1952), sec. 266)

The invention described herein may be manufactured and used by or for the Government of the United States of America for governmental purposes without the payment of any royalties thereon or therefor.

This invention relates to an improved teletypewriter communication system and more particularly to an improved teletypewriter communication system wherein the receiver is precluded from running open and wherein the receiver shuts down when the signal direct current is terminated for longer than a predetermined period.

Teletypewriter communication systems are in extensive use. General and detailed explanations and descriptions of the systems are available in the literature. A brief explanation may be obtained from many well known handbooks, e.g., Electrical Engineers' Handbook on Electric Communication and Electronics, fourth edition, edited by Pender and McIlwain, published by John Wiley and Sons.

The term running open is a common one in the art of teletypewriter communication. It denotes a condition of operation at the teletypewriter receiver wherein the direct current which maintains the receiver in a quiescent condition is no longer present. The receiver has lost its signal direct current supply and as a result, the receiver's movable components race without control and without producing a useful output. Wear of the components is accelerated and if running open continues for an appreciable length of time, say several hours, the receiver probably will suffer considerable damage. The causes of the running open condition include a break in the signal line, a short in the signal line, or termination of direct current in the signal line receiver.

The loss of signal direct current necessitates closing down the teletypewriter communication system or network until the source of trouble is located and eliminated. At each of the receiver stations of the network, the operator must switch off the local power supply to the receiver motor to stop the receiver from running open. Inasmuch as teletypewriter contact with the transmitter is lost when this is done, there is no convenient way for each operator to ascertain when the signal direct current is restored and communication is resumed. The result is numerous telephone calls among operators and servicemen. At an unattended station, the receiver continues running open until signal direct current supply is restored or someone arrives to switch off the power supply to the motor. Many stations are unattended during part of each day.

An object of this invention is to provide an improved teletypewriter communication system.

A further object is to provide an improved teletypewriter communication system which will not run open.

A further object is to provide an improved teletypewriter communication system wherein the receivers of the system cease operation in the absence of direct current in the signal line for longer than a predetermined interval and afford an indication of the condition and also commence operation automatically after a short interval when direct current in the signal line is restored.

Figure 2:
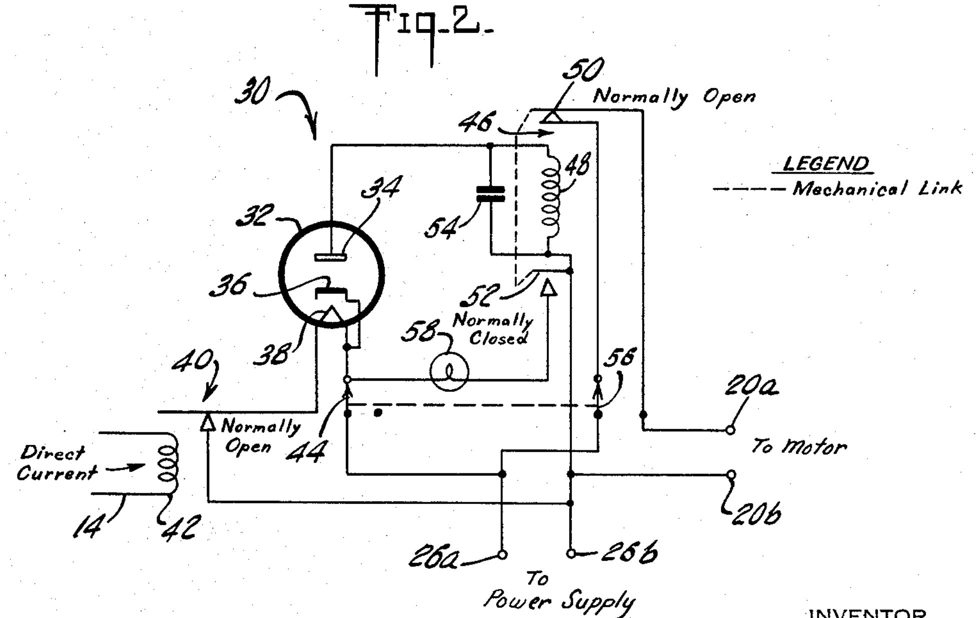

Other objects and many of the attendant advantages of this invention will be readily appreciated as the same becomes better understood by reference to the following detailed description when considered in connection with the accompanying drawing wherein:

Fig. 1 shows in block form a conventional teletypewriter system in combination with the novel feature of this invention, and Fig. 2 is a schematic diagram of the novel running-open cutoff shown in block form in Fig. 1; it is shown in its operating condition corresponding to the presence of direct current in the signal line.

In Fig. 1 there is shown a conventional teletypewriter system including a teletypewriter transmitter 10, a teletypewriter receiver 12, coupled by a signal line 14. The teletypewriter transmitter 10 conventionally includes a source 16 of constant predetermined level of direct current usually 60 milliamperes. In series with the current source 16 is a switch device 18. The details of the switch device 18 and the details of the mechanism (not shown) for operating the switch device form no part of this invention. They are parts of the transmitter. The signal line 14 is generally a telephone line but need not be. The signal line circuit is continuous except at switch device 18. When the device 18 is open, no current flows; when the switch device 18 is closed full current flows. These are the only two current conditions in signal line 14. Information is conveyed by the signal line 14 from the transmitter 10 to the receiver 12 in the form of direct current mark (pulse) space (no pulse) groupings.

The teletypewriter receiver 12 includes a motor 20, a main shaft 22 for driving the mechanism (not shown) of the receiver 12 and a clutch device 24 for coupling and decoupling the motor 20 and main shaft 22. The clutch device 24 is magnetically operated; when no current flows in the signal line 14, the clutch device couples the motor 20 and main shaft 22 and when current flows in the signal line 14, the clutch device decouples the motor 20 and main shaft 22. This is conventional. The motor 20 is connected in series with a power supply 26 through a manually operable switch 28. If the other side of power supply 26 is connected directly to motor 20, the running open condition occurs whenever the signal line 14 is cut, shorted, or the direct current in the signal line is terminated for longer than a predetermined interval. If an operator is present, when running-open occurs, he opens switch 28. If no operator is present the running-open condition continues.

The automatic running-open cutoff 30 of this invention prevents the receiver from running open. The running-open cutoff 30 is responsive to loss of current in the signal line 14 for longer than a predetermined period to disconnect the motor 20 from power supply 26 but is unaffected by combinations of mark and space pulses.

An embodiment of the running-open cutoff 30 is shown in Fig. 2. The cutoff as shown in the figure is in running closed operating condition, i.e., there is direct current in signal line 14. The cutoff 30 includes a vacuum diode 32 having an anode 34, a cathode 36, and a filament 38. The cathode 36 is connected to one end of filament 38. A normally open switch 40 is connected in series with one end of filament 38. A coil 42 connected in series with the signal line 14 closes the switch 40 as in Fig. 2 when current flows in line 14 and permits the switch 40 to open when no current flows in the signal line 14. The other side of filament 38 and the cathode 36 are connected in common to power supply terminal 26a through a manually operable switch 44.

Included in cutoff 30 is a relay 46. The relay 46 has a coil 48, a normally open switch 50 and a normally closed switch 52. The coil 48 is connected between the anode 34 of the diode and the power supply terminal 26b. The diode 32 functions as a half-wave rectifier. Condenser 54 bypasses the alternating current components; the power frequency hum is filtered out so that the relay switches do not chatter while the relay is active. A manually operable switch 56 is connected in series with the switch 50 and power supply terminal 26a. An indicator lamp 58 is connected in series with power supply terminal 26a, switch 44, switch 52 and power supply terminal 26b. The contactors of switches 44 and 56 are ganged and are movable to a second position; in their second position the contactor of switch 44 engages a dead contact and the contactor of switch 56 shunts the switch 50.

The switches 44 and 56 are manually operable. In their position indicated in Fig. 2, the cutoff 30 is active. In their other position the cutoff 30 including indicator lamp 58 is inactive; the motor 20 is connected directly to power supply 26 through switch 56.

When the switches 44 and 56 are in the position indicated in Fig. 2, the cathode-anode circuit of the rectifier 32 conducts if its filament 38 is hot. Since the filament circuit of diode 32 is completed to power supply 26 when the switch 40 is closed, the filament 38 is hot when direct current flows in the signal line 14; the filament 38 continues to be hot, even when the switch 40 is opening and closing at the signal pulse rate, because of the heat delay time of the filament. So long as the filament 38 remains hot, current continues to flow from power supply 26 through relay coil 48, holding open switch 52 and holding closed the switch 50. Open switch 52 prevents current flow through indicator lamp 58, closed switch 50 connects motor 20 to power supply 26. When the filament 38 becomes cold the diode 32 ceases to conduct, current ceases to flow through relay coil 40 whereby switch 50 opens to disconnect motor 20 from power supply 26 and switch 52 closes to connect indicator lamp 58 to power supply 26.

An ascertainable time interval elapses before the cold filament becomes hot enough for the relay to be activated. An ascertainable interval elapses before the hot filament becomes cold enough for the relay to be deactivated. The delay time depends upon the particular diode and the power supply voltage. The delay time in cooling off must be far longer than the length of signal pulses. The disadvantage arising from the time delay when the teletypewriter receiver is turned on at switch 28 (Fig. 1) is not significant.

The cutoff 30 may include a time delay relay activated directly by current in line 14 instead of the diode circuit shown. However, a time delay relay is more expensive and requires more maintenance.

Not only does the cutoff 30 prevent a teletypewriter receiver from running open but it is also useful for shutting down receivers by remote control when there is no message traffic. This is accomplished by shutting off the signal direct current at its source. Power is conserved and the life of cutoff 30 is extended.

Obviously many modifications and variations of the present invention are possible in the light of the above teachings. It is therefore to be understood that within the scope of the appended claims the invention may be practiced otherwise than as specifically described.

I claim:

1. In a teletypewriter communication system including a teletypewriter transmitter, a teletypewriter receiver and a signal line for carrying direct current coupling said transmitter and said receiver, wherein said transmitter includes a source of constant direct current of a particular level connected in series with said signal line and a switch device in series with said signal line for selectively interrupting the continuity in said signal line for conveying information in the form of pulses to said receiver, and wherein said receiver includes a main shaft, a motor and a clutch device, said signal line connected with said clutch device for permitting said clutch device to couple said motor and said main shaft when current flow through said signal line is interrupted at said switch device and for decoupling said motor and said main shaft when there is no current flow through said signal line; the combination therewith of a running-open cutoff, said cutoff including a motor switch connected in series with said motor, and means coupled to said signal line and said motor switch and activated by current flow in said signal line for longer than a predetermined short interval for operating said motor switch to closed circuit condition, said means being deactivated when current flow in said signal line is absent for longer than a predetermined short interval for operating said motor switch to open circuit condition.

2. The teletypewriter communication system defined in claim 1 wherein said motor switch is normally open and is magnetically operable and wherein said means includes a vacuum diode having an anode, a cathode, and a filament, a second normally open magnetically operable switch connected in series with said filament for connecting and disconnecting said filament from a power source, a magnetic coil connected in series with said signal line and disposed adjacent said second normally open magnetically operable switch for closing said second switch whenever current flows in said signal line and permitting said second switch to open whenever current ceases to flow in said signal line, a second coil disposed adjacent said motor switch and connected at one end in series with said anode, the other end of said second coil and said cathode when connected to a power supply will permit current to pass through said second coil only when said anode is positive relative to said filament and said filament is hot, whereby whenever current flows through said second coil, said motor switch is closed.

3. The teletypewriter communication system as defined in claim 2 further including a manually operable switch for bypassing said motor switch.

4. The teletypewriter communication system as defined in claim 3, further including a manually operable switch in series with said filament and ganged with said first-mentioned manually operable switch whereby when said motor switch is bypassed the filament circuit is open.

5. In a teletypewriter communication system of the type having a source of constant direct current, a line for carrying said current from a sending station to a receiving station, means at the sending station to interrupt said current and create signal current pulses in the line, and means at said receiving station operated by the current pulses in said line to couple and uncouple a normally continuously running motor and an operating shaft, that improvement therein to inactivate said motor where abnormally long time lapses occur in the current supplied to said coupling and uncoupling means through said line and thus prevent unnecessary wear on the motor and useless consumption of power, which comprises means at said receiving station and responsive to current flow in said line, means operable to alternately activate and inactivate said motor, and time delay means controlled by said responsive means and operable on said motor activating and inactivating means to cause the latter to inactivate said motor during absence of current flow in said line for any period longer than a predetermined short interval that is longer than the length of expected signal pulses, and to reactivate said motor upon return of current flow to said line.

6. In a teletypewriter communication system of the type having a source of constant direct current, a line for carrying said current from a sending station to a receiving station, means at the sending station to interrupt said current and create signal current pulses in the line, and means at said receiving station operated by the current pulses in said line to couple and uncouple a normally continuously running motor and an operating shaft, that improvement therein to save unnecessary consumption of power and wear of the motor during each abnormally long continuous time period of current curtailment which comprises, at said receiving station, means for controlling the operation of said motor, time delay means for controlling said motor controlling means, and means responsive to current flow in said line as received at said receiving station and operable for controlling the operation of said motor through said time delay means to curtail the activity of said motor during said curtailed current flow in said line at said receiving station and to restore said motor to normal operation upon a return of normal current flow in said line at said receiving station.

References Cited in the file of this patent

UNITED STATES PATENTS

| | | |
|---|---|---|
| 1,751,374 | Waltenath | Mar. 18, 1930 |
| 1,872,560 | Breisky | Aug. 16, 1932 |
| 2,121,760 | Lowry et al. | June 21, 1938 |
| 2,231,420 | Gille | Feb. 11, 1941 |
| 2,457,112 | Abercrombie et al. | Dec. 28, 1948 |
| 2,554,847 | Vanderlippe | May 29, 1951 |

FOREIGN PATENTS

| | | |
|---|---|---|
| 207,418 | Switzerland | Feb. 1, 1940 |